US008935962B2

(12) United States Patent
Gammon

(10) Patent No.: US 8,935,962 B2
(45) Date of Patent: Jan. 20, 2015

(54) DIFFERENTIAL PRESSURE GAUGE HAVING A ROTATING POSITIONAL ELEMENT

(71) Applicant: Gammon Technical Products, Inc., Manasquan, NJ (US)

(72) Inventor: James H. Gammon, Manasquan, NJ (US)

(73) Assignee: Gammon Technical Products, Inc., Manasquan, NJ (US)

(*) Notice: Subject to any disclaimer, the term of this patent is extended or adjusted under 35 U.S.C. 154(b) by 270 days.

(21) Appl. No.: 13/668,816

(22) Filed: Nov. 5, 2012

(65) Prior Publication Data

US 2013/0112004 A1 May 9, 2013

Related U.S. Application Data

(60) Provisional application No. 61/555,196, filed on Nov. 3, 2011.

(51) Int. Cl.
*G01L 9/00* (2006.01)
*G01B 7/30* (2006.01)
*G01L 13/02* (2006.01)

(52) U.S. Cl.
CPC .............. *G01B 7/30* (2013.01); *G01L 9/0089* (2013.01); *G01L 13/02* (2013.01)
USPC .............................................. 73/745; 73/715

(58) Field of Classification Search
None
See application file for complete search history.

(56) References Cited

U.S. PATENT DOCUMENTS

| | | | | |
|---|---|---|---|---|
| 3,980,040 A * | 9/1976 | Read | ............................. | 116/267 |
| 4,208,649 A * | 6/1980 | Sarides | ........................ | 340/448 |
| 4,602,513 A * | 7/1986 | Hirota et al. | .................... | 73/725 |
| 4,702,675 A * | 10/1987 | Aldrovandi et al. | ............ | 417/63 |
| 4,955,545 A * | 9/1990 | Stern et al. | ..................... | 239/320 |
| 5,331,838 A * | 7/1994 | Delajoud | ....................... | 73/1.65 |
| 5,542,293 A * | 8/1996 | Tsuda et al. | ................. | 73/146.5 |
| 5,814,725 A * | 9/1998 | Furuichi et al. | ............. | 73/146.5 |
| 6,137,288 A * | 10/2000 | Luetzow | .................... | 324/207.2 |
| 6,472,865 B1 * | 10/2002 | Tola et al. | .................. | 324/207.2 |
| 7,268,538 B2 * | 9/2007 | Johnson | .................... | 324/207.25 |
| 7,930,943 B2 * | 4/2011 | Kageyama et al. | ............. | 73/716 |
| 8,616,066 B2 * | 12/2013 | Sprenger et al. | ................ | 73/744 |
| 2006/0038557 A1 * | 2/2006 | Johnson | .................. | 324/207.25 |

* cited by examiner

*Primary Examiner* — Peter Macchiarolo
*Assistant Examiner* — Jermaine Jenkins
(74) *Attorney, Agent, or Firm* — Fraser Clemens Martin & Miller LLC; James D. Miller

(57) ABSTRACT

A sensor assembly including a flexible member having a first end and a second end, a rotating member connected to the second end of the flexible member, a positional element disposed on the rotating member, and a sensor capable of sensing a movement of the positional element. A movement of the second end of the flexible member allows the rotating member and the positional element to rotate.

20 Claims, 4 Drawing Sheets

DIFFERENTIAL PRESSURE GAUGE HAVING A ROTATING POSITIONAL ELEMENT

CROSS-REFERENCE TO RELATED APPLICATION

This application claims priority to U.S. Provisional Patent Application Ser. No. 61/555,196, filed Nov. 3, 2011, the entire disclosure of which is hereby incorporated herein by reference.

FIELD OF THE INVENTION

The present disclosure relates to a differential pressure gauge and more particularly to a differential pressure gauge for measuring, displaying and outputting a signal of differential pressure using a rotating positional element.

BACKGROUND OF THE INVENTION

This section provides background information related to the present disclosure which is not necessarily prior art. It is often beneficial to monitor the condition of filter elements. One of the most common ways to monitor the condition of filter elements is to measure a difference in pressure across a filter vessel using a differential pressure gauge. The measurable difference in pressure occurs over time because, in a clean filter, a fluid flows freely without restriction, and in a filter filled with dirt and debris, the fluid flow is restricted, thus resulting in an increased pressure drop as the fluid flows through the filter vessel.

Various types of differential pressure gauges are available. For example, a pressure gauge including a piston may be used to measure the difference in pressure. Using such a device, the motion of a close fitting piston is balanced by a spring and is observed in a housing disposed around the piston and forming a piston chamber. A higher filter inlet pressure is applied to a side of the piston not connected to the spring, and a lower filter outlet pressure is applied to a side of the piston connected to the spring. As the difference in pressure becomes greater, the piston moves to compress the spring until the total force on one side of the piston is equal to the total force on the other side of the piston. As a result, a position of the piston indicates the differential pressure across the filter vessel.

The position of the piston may be determined in various ways. The housing may be transparent, allowing a user to actually see the position of the piston, or a sensor may be used to sense the position of the piston. Such a sensor may be a magnetic sensor. However, disadvantages of using the magnetic sensor include expensive materials, increased errors in differential pressure readings due to damage or hindrance from the presence of contaminants between the piston and the housing, numerous components, and increased interference.

It would be desirable to have a differential pressure gauge that is inexpensive to make, and that uses a rotating positional element located remote from the piston that minimizes interference, friction, and errors, is highly reliable, and does not attract contaminants to the piston.

SUMMARY OF THE INVENTION

Consonant with the present invention, a differential pressure gauge that is inexpensive to make, and that uses a rotating positional element located remote from the piston that minimizes interference, friction, and errors, is highly reliable, and does not attract contaminants to the piston, has surprisingly been discovered.

In one embodiment of the invention, a sensor assembly comprises a flexible member having a first end and a second end, a rotating member connected to the second end of the flexible member, and a positional element disposed on the rotating member. The sensor assembly further includes a sensor capable of sensing a movement of the positional element. A linear movement of the flexible member allows the rotating member and the positional element to rotate and the rotational movement of the positional element to be sensed by the sensor.

In another embodiment of the invention, a differential pressure gauge comprises a housing forming a chamber having a first end and a second end, a piston slidably disposed in the chamber, and a flexible member having a first end and a second end. The first end of the flexible member is attached to the piston. The differential pressure gauge further includes a rotating member connected to the second end of the flexible member and disposed adjacent the second end of the chamber, a positional element disposed on the rotating member, and a sensor capable of sensing a movement of the positional element. A pressure source in fluid communication with the chamber causes a linear movement of the piston toward the rotating member and the linear movement of the piston allows the rotating member and the positional element to rotate and the rotational movement of the positional element to be sensed by the sensor.

In yet another embodiment of the invention, a differential pressure gauge comprises a housing forming a chamber having a first end and a second end, a piston slidably disposed in the chamber, a flexible member having a first end and a second end, the first end of the flexible member attached to the piston, and a rotating member connected to the second end of the flexible member and disposed adjacent the second end of the chamber in a first housing. A magnet is disposed on a center portion of the rotating member and a magnetic field sensor is disposed in a second housing separate from the first housing and is capable of sensing a rotational movement of the magnet. A longitudinal axis of the magnet is perpendicular to a longitudinal axis of the rotating member. A pressure source in fluid communication with the chamber causes a linear movement of the piston toward the rotating member and the linear movement of the piston allows the rotating member and the magnet to rotate and the rotational movement of the magnet to be sensed by the magnetic field sensor.

BRIEF DESCRIPTION OF THE DRAWINGS

The above, as well as other advantages of the present invention, will become readily apparent to those skilled in the art from the following detailed description when considered in the light of the accompanying drawings, in which.

DETAILED DESCRIPTION OF AN EMBODIMENT OF THE INVENTION

Figure 1:
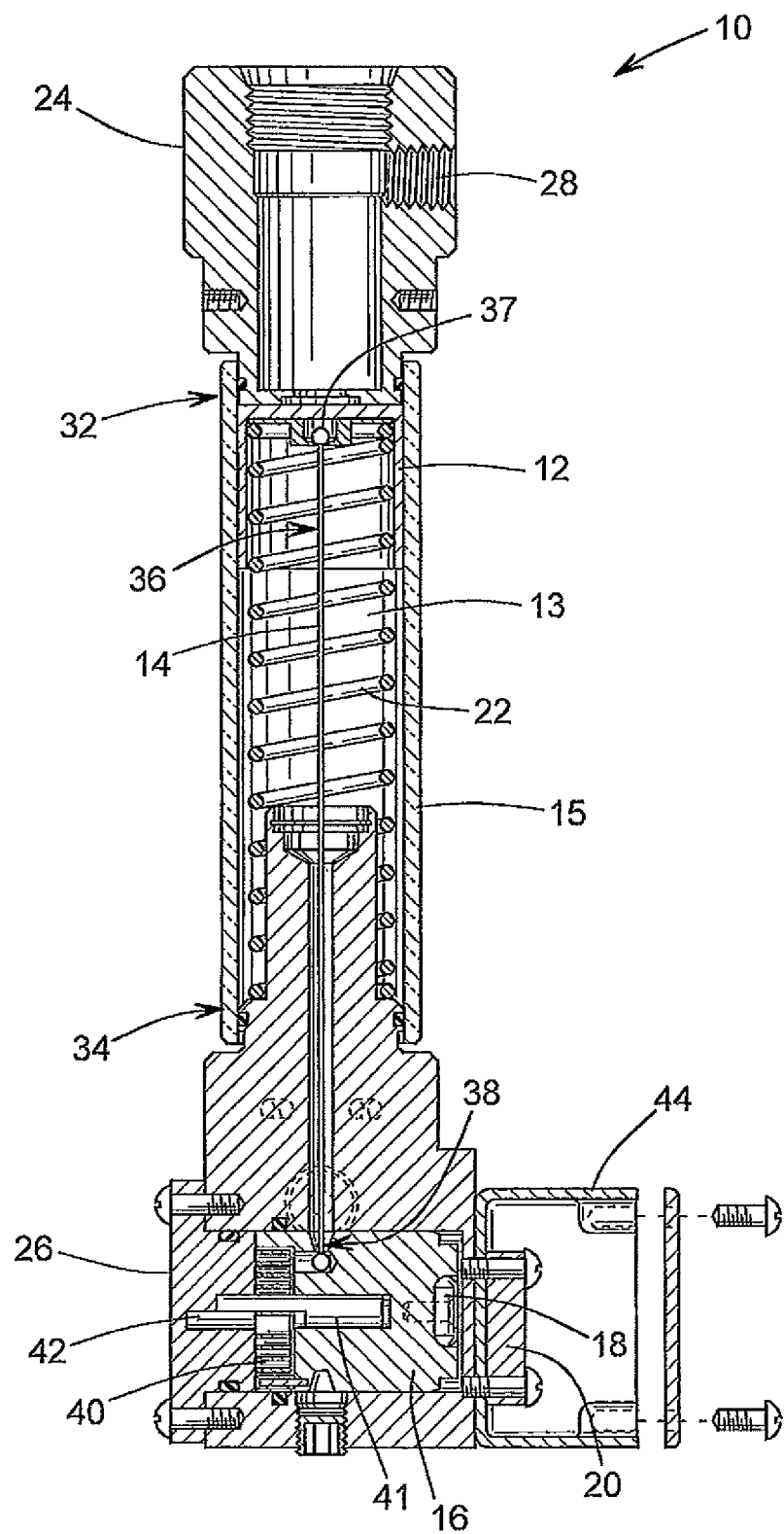
FIG. 1 is a cross-sectional side elevational view showing a differential pressure gauge including a rotating positional element according to an embodiment of the present disclosure.

The following detailed description and appended drawings describe and illustrate an exemplary embodiment of the invention. The description and drawings serve to enable one skilled in the art to make and use the invention, and are not intended to limit the scope of the invention in any manner.

Referring to the drawings, there is illustrated a differential pressure gauge incorporating the features of the disclosure, generally indicated by reference numeral 10. The pressure gauge 10 includes a piston 12, a flexible member 14, a rotating member 16, a positional element 18, and a sensor 20.

In certain embodiments of the disclosure, the piston 12 has a circular cross-sectional shape. However, the cross-sectional shape of the piston 12 may be any shape, as desired. The piston 12 is slidably disposed within a chamber 13 formed in a housing 15. Typically, the piston 12 conforms to the shape of the chamber 13 to maintain a close tolerance. A clearance between an outer wall of the piston 12 and an inner wall of the chamber 13 may be approximately 0.0003 inches or less, for example. The piston 12 may be made from any durable material capable of withstanding pressures normally occurring in the pressure gauge 10. It is desirable for the piston 12 to be formed from a material capable of sliding through the chamber 13 and producing little to no friction.

The housing 15 forming the chamber 13 is disposed between and connects a first housing member 24 and a second housing member 26, and may be made from any material capable of withstanding the pressures occurring in the pressure gauge 10. The chamber 13 may be any size and shape appropriate for housing the piston 12, a spring 22, and the flexible member 14. In certain embodiments, the housing 15 is provided from translucent glass, but it is understood that the housing 15 may be made from plastic, metal, or other material.

The first housing member 24 is disposed at a first end 32 of the housing 15. The housing 15 and the first housing member 24 form a substantially fluid-tight seal using a sealing means such as an o-ring, a piston ring, or the like, for example. It is understood that the housing 15 and/or the first housing member 24 may include a channel or notched portion to receive the sealing means. The first housing member 24 includes a first pressure inlet 28 configured for communication with a source of pressurized fluid (not shown). The first pressure inlet 28 is in fluid communication with a high pressure source (not shown). Any conventional material may be used to form the first housing member 24 such as plastic or metal, for example.

The second housing member 26 is disposed at a second end 34 of the housing 15. The housing 15 and the second housing member 26 form a substantially fluid-tight seal using a sealing means such as an o-ring, a piston ring, or the like, for example. It is understood that the housing 15 and/or the second housing member 26 may include a channel or notched portion to receive the sealing means. The second housing member 26 includes a second pressure inlet 30 configured for communication with a source of pressurized fluid (not shown). The second pressure inlet 30 is in fluid communication with a low pressure source (not shown). Any conventional material may be used to form the second housing member 26 such as plastic or metal, for example. The second housing member 26 houses the rotating member 16, a spring 40, and the positional element 18.

The spring 22 is typically a helical compression spring but may be any spring capable of withstanding compression resulting from a linear movement of the piston 12. The spring 22 may be any size and shape capable of being housed in the chamber 13. A first end of the spring 22 abuts a surface of the piston 12 or may be otherwise in operable contact with the piston 12. In certain embodiments of the disclosure, the first end of the spring abuts a first end of the piston and a washer is disposed therebetween. A second end of the spring 22 abuts the second housing member 26 or may extend into the second housing member 26. The spring 22 urges the piston 12 toward a position at a first end 32 of the chamber 13 adjacent the first housing member 24 when no pressures are applied to the pressure gauge 10.

The flexible member 14 may be made from a string, wire, cable, or any other suitable material. Typically, the flexible member 14 is made from metal. A first end 36 of the flexible member 14 is attached to the piston 12. In certain embodiments, the first end 36 of the flexible member 14 is disposed between the first end of the piston 12 and the first end of the spring 22. The first end 36 of the flexible member 14 may be attached directly to the piston 12 by any conventional means or may be connected to the piston 12 via an attachment element 37 such as the washer, for example. In certain embodiments where the flexible member 14 is indirectly connected to the piston 12 using an attachment element 37 such as the washer, the flexible member 14 may extend through an opening in the washer and a first nut may connect to the first end 36 of the flexible member 14 to hold the flexible member 14 in place and secure the flexible member 14 to the piston 12.

The rotating member 16 is disposed in the second housing member 26. In certain embodiments, a second end 38 of the flexible member 14 is connected to the rotating member 16 through an opening in a wall forming a channel 39 formed on a surface of the rotating member 16 using any conventional means. For example, the second end of the flexible member may extend through the opening in the channel and a second nut may connect to the second end of the flexible member to hold the flexible member in place and secure the flexible member to the rotating member. The rotating member 16 is in operable contact with and urged in a first rotational direction by the spring 40. An attachment element 41 such as a pivot pin, for example, may be used to connect the rotating member 16 to the spring 40. Any material such as metal or plastic, for example, may be used to form the rotating member 16. The rotating member 16 may be any size and shape capable of being housed in the second housing member 26, and may be a right circular cylinder, a wheel, or other object, as desired.

The spring 40 may be a torsional spring or may be any spring capable of urging the rotating member 16 in the first rotational direction. The spring 40 may be any size and shape capable of being housed in the second housing member 26 with the rotating member 16. A first end of the spring 40 may be connected to or abut a surface of the second housing member 26. The spring 40 is typically tensioned by the rotating member 16 when the piston 12 is resting at the first end 32 of the chamber 13 and no pressure is being applied to the pressure gauge 10. In certain embodiments of the invention, the attachment element 41 connecting the rotating member 16 and the spring 40 may hold the spring 40 in the tensioned position. An anchoring element 42 such as a pin, for example, may be used to secure the spring 40 in the second housing member 26.

Figure 2:
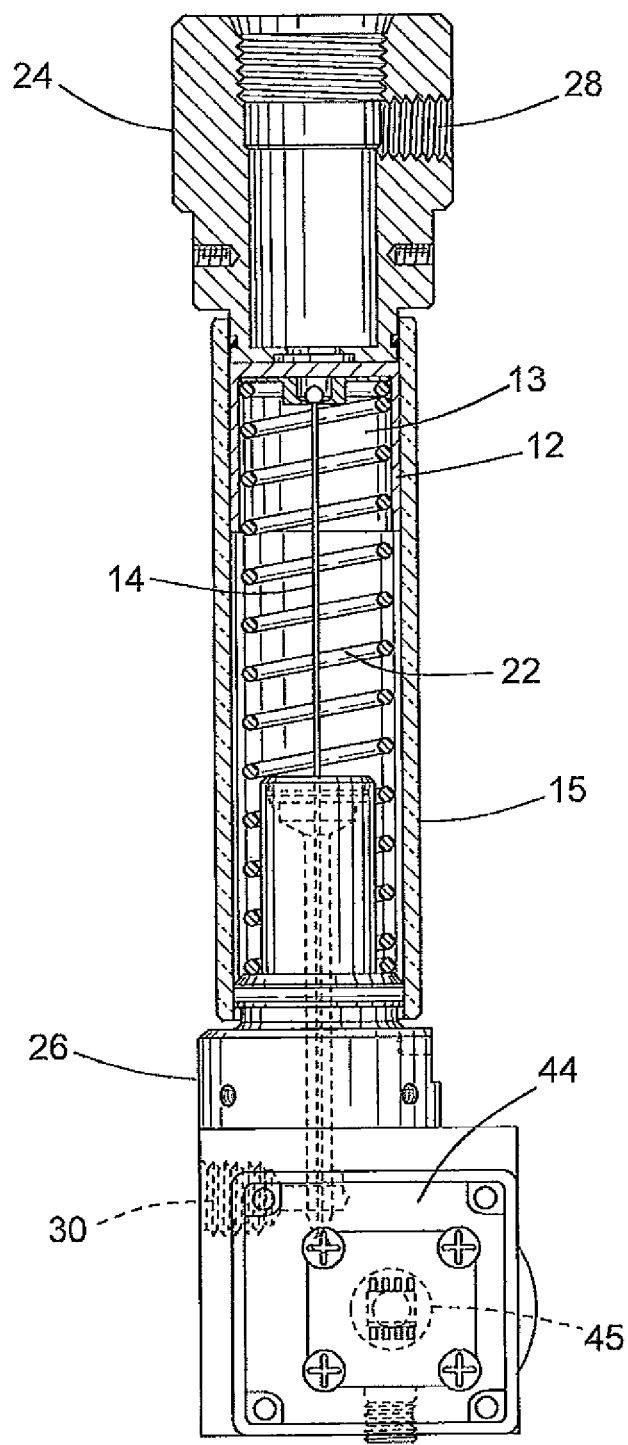
FIG. 2 is a front elevational view showing the differential pressure gauge shown in FIG. 1, having one end including a first housing member and a tube shown partially in section.
Figure 3:
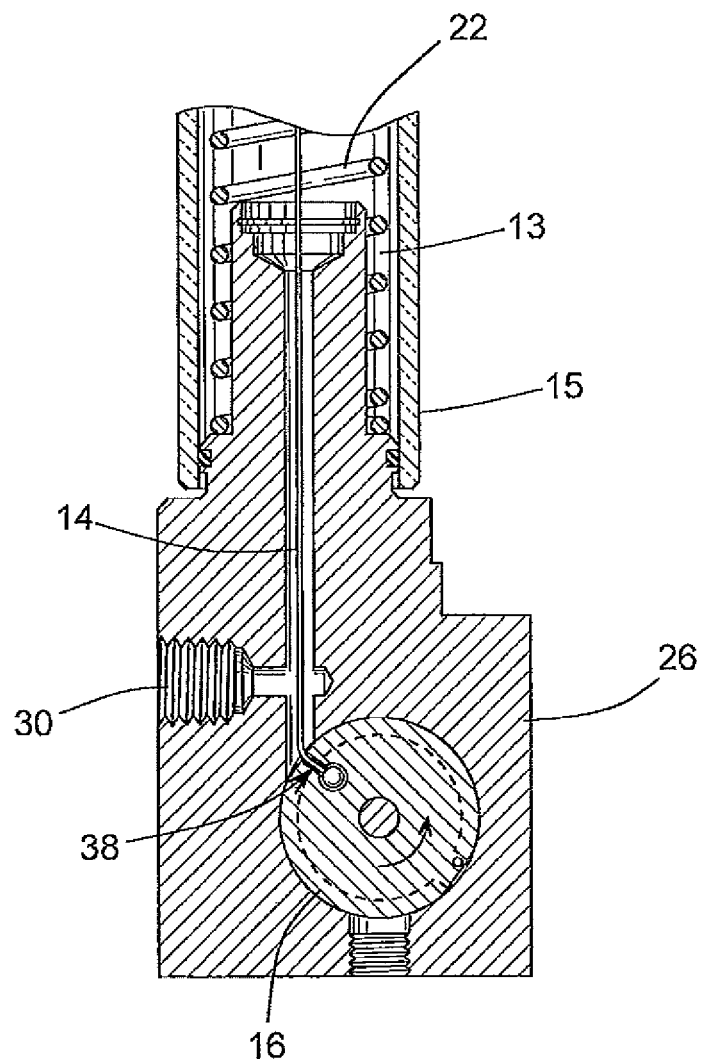
FIG. 3 is a fragmentary cross-sectional front elevational view of a spring and rotating member shown in FIG. 1.
Figure 4:
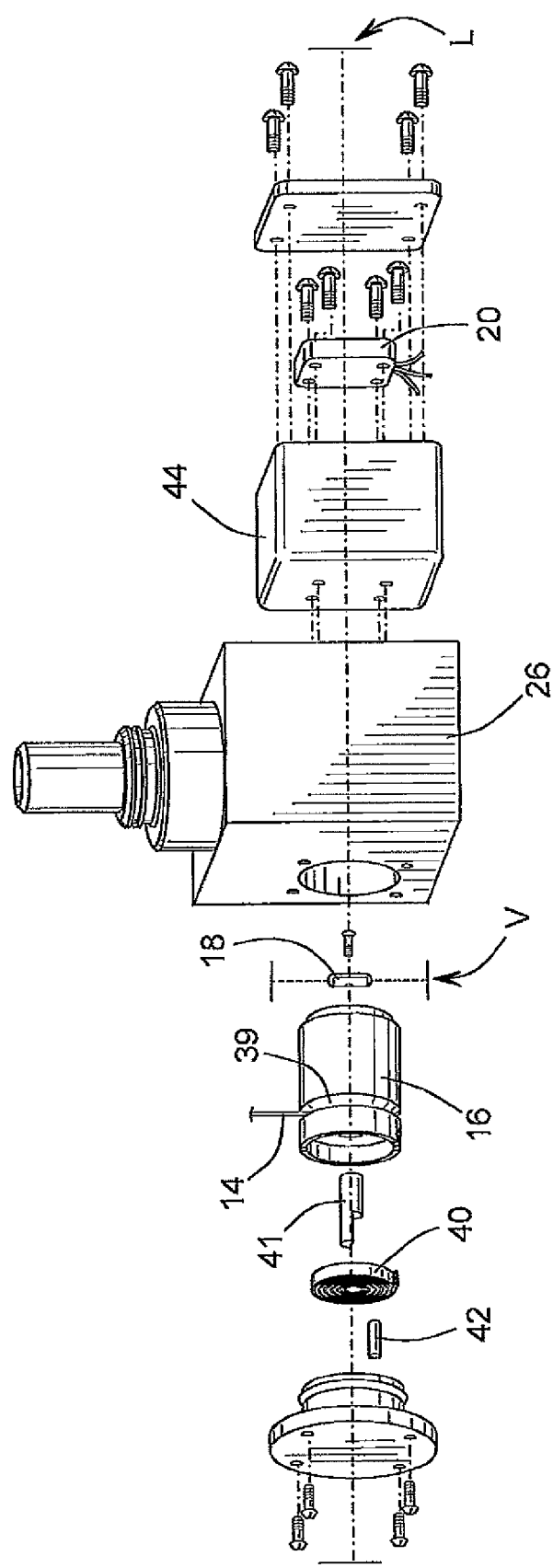
FIG. 4 is an exploded side perspective view of a second end of the pressure gauge shown in FIG. 1 including the rotating member shown in FIG. 3.

The positional element 18 is typically disposed at an end of the rotating member 16, but may be disposed anywhere on the rotating member 16. In certain embodiments, the positional element 18 may be mounted on or otherwise attached to a center portion of the end of the rotating member 16. For example, the positional element 18 may be disposed in a groove on the end of the rotating member 16 and secured in the groove using a screw or any other conventional means for securing the positional element 18. The positional element 18 may be any size and shape, as desired. Any object capable of being detected by the sensor 20 may be used for the positional element 18. For illustrative purposes, FIGS. 1-4 show the positional element 18 as a magnet. A longitudinal axis (V) of the magnet 18 is typically perpendicular to a longitudinal axis (L) of the rotating member 16 and/or the sensor 20. However, the orientation of the magnet 18 may vary, as desired.

The sensor 20 is typically disposed on a surface of or adjacent to the second housing member 26 and is positioned to detect and measure a rotational movement of the positional element 18 disposed on the rotating member 16. Although FIGS. 1-4 show the rotating member 16, the spring 40, the positional element 18, and the sensor 20 housed in or adjacent to the second housing member 26, it is also understood that the sensor 20 may be housed in the first housing member 24 or other location, as desired. The sensor 20 may be in a separate housing 44 attached to a surface of the second housing member 26 in order to mitigate against interference from dirt and debris, or may be built into the surface of the second housing member 26. Alternatively, the sensor 20 may be included in a circuit board 45 attached to the surface of the second housing member 26 or within the housing 44. The sensor 20 typically produces an output such as a voltage output or other signal, for example, that may be converted to a visual output for observation by a user using an analog or digital chip, for example. The visual output indicates a measure of the extent of the rotational movement of the positional element 18. The sensor 20 is typically a magnetic field sensor 20, but may be any sensor type capable of detecting the rotational movement of the positional element 18. A rotational element (not shown) may be used to manually adjust a position of the sensor 20.

In use, the source of high pressure fluid enters the differential pressure gauge 10 through the first pressure inlet 28 and the source of low pressure fluid enters the differential pressure gauge 10 through the second pressure inlet 30. The difference in pressure in the pressure gauge 10 occurring between the first pressure inlet 28 and the second pressure inlet 30 causes the piston 12 to slide away from the first end 32 of the chamber 13 and compress the spring 22, and the first end 36 of the flexible member 14 to move toward the second housing member 26. The movement of the flexible member 14 allows the second end 38 of the flexible member 14 to be wound around the rotating member 16, thereby allowing the rotating member 16 to be rotated by the spring 40.

The rotation of the rotating member 16 causes the positional element 18 to rotate while simultaneously alleviating tension on the spring 40. As the positional element 18 rotates, the sensor 20 detects the rotational movement of the positional element 18 and produces the output. The output is then converted to the visual output such as by the analog or digital chip, for example, for observation by the user and is used to determine a differential pressure in the pressure gauge 10. The pressure gauge 10 may be used to measure differential pressure across a filter vessel (not shown) to determine a condition of the filter elements (not shown), for example.

When not in use, the spring 22 urges the piston towards the position at the first end of the chamber 13. The spring 22 may be tensioned or relaxed when the piston is in the first position at the first end of the chamber 13. Additionally, the spring 40 and the rotating member 16 may be preset so that the rotating member 16 has rotated a predetermined number of rotations such as one full rotation, for example. The spring 40 is typically tensioned at all times, however, the tension is relieved as the flexible member 14 allows the rotating member 16 to rotate.

There are several advantages to producing a differential pressure gauge 10 as described above. First, placing the positional element 18 next to the piston 12 attracts magnetic and other debris to the piston 12 such as iron rust, for example, and may cause seizing of the piston 12 and interference. However, placement of the positional element 18 in the second housing member 26 minimizes such interference. Additionally, placement of the sensor 20 in the separate housing also minimizes unwanted debris and interference.

Second, minimal parts and components are required for the differential pressure gauge 10, and no parts are required to exit the pressure gauge 10 in order to reach the sensor 20 and provide the output measurement of the differential pressure. This eliminates the need for additional seals and components which may increase the likelihood of increased errors in the output measurement of the differential pressure.

Third, the above-disclosed positional element 18 and sensor 20 are inexpensive and highly reliable, ensuring an accurate output measurement of the differential pressure at a low cost.

Lastly, the material used for the piston 12, the housing 15, the first housing member 24, and the second housing member 26 may be inexpensive, and the piston 12, the housing 15, the first housing member 24, and the second housing member 26 do not require customization.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A sensor assembly comprising:
   a flexible member having a first end and a second end;
   a rotating member connected to the second end of the flexible member;
   a positional element disposed on the rotating member; and
   a sensor capable of sensing a movement of the positional element,
   wherein a linear movement of the first end of the flexible member allows the rotating member and the positional element to rotate and the rotational movement of the positional element to be sensed by the sensor.

2. The sensor assembly of claim 1, wherein the second end of the flexible member is connected to the rotating member through an opening in a wall forming a channel disposed on a surface of the rotating member.

3. The sensor assembly of claim 1, wherein the positional element is a magnet and the sensor is a magnetic field sensor.

4. The sensor assembly of claim 1, wherein the sensor produces a voltage output based on the rotational movement of the positional element.

5. The sensor assembly of claim 4, wherein the voltage output is converted to a visual output using a digital chip for observation by a user.

6. The sensor assembly of claim 1, wherein the linear movement of the first end of the flexible member occurs in a direction perpendicular to an axis of rotation of a rotating member.

7. A differential pressure gauge comprising:
   a housing forming a chamber having a first end and a second end;
   a piston slidably disposed in the chamber;
   a flexible member having a first end and a second end, the first end of the flexible member attached to the piston;
   a rotating member connected to the second end of the flexible member and disposed adjacent the second end of the chamber;
   a positional element disposed on the rotating member; and
   a sensor capable of sensing a movement of the positional element;

wherein a pressure source in fluid communication with the chamber causes a linear movement of the piston toward the rotating member; and wherein the linear movement of the piston allows the rotating member and the positional element to rotate and the rotational movement of the positional element to be sensed by the sensor.

8. The differential pressure gauge of claim 7, wherein a first spring disposed in the chamber urges the piston towards a position adjacent the first end of the chamber.

9. The differential pressure gauge of claim 8, wherein the first spring is substantially relaxed when the piston is in the position adjacent the first end of the chamber, and wherein the first spring is compressed when the piston is moved from the position adjacent the first end of the chamber.

10. The differential pressure gauge of claim 7, wherein a second spring is connected to the rotating member, and wherein the rotation of the rotating member causes the second spring to be compressed when the piston is in the position adjacent the first end of the chamber.

11. The differential pressure gauge of claim 10, wherein the rotation of the rotating member decompresses the second spring when the piston moves away from the position adjacent the first end of the chamber.

12. The differential pressure gauge of claim 7, wherein the positional element is a magnet and the sensor is a magnetic field sensor.

13. The differential pressure gauge of claim 12, wherein the magnet is disposed on a center portion of an end of the rotating member.

14. The differential pressure gauge of claim 12, wherein a longitudinal axis of the magnet is perpendicular to a longitudinal axis of the rotating member.

15. The differential pressure gauge of claim 7, wherein the produces a voltage output based on the rotational movement of the positional element.

16. The differential pressure gauge of claim 15, wherein the voltage output is converted to a visual output using a digital chip for observation by a user.

17. A differential pressure gauge comprising:
a housing forming a chamber having a first end and a second end;
a piston slidably disposed in the chamber;
a flexible member having a first end and a second end, the first end of the flexible member attached to a first end of the piston;
a rotating member connected to the second end of the flexible member and disposed adjacent the second end of the chamber in a first housing;
a magnet disposed on a center portion of the rotating member; and
a magnetic field sensor disposed in a second housing separate from the first housing and capable of sensing a rotational movement of the magnet;
wherein a longitudinal axis of the magnet is perpendicular to a longitudinal axis of the rotating member;
wherein a pressure source in fluid communication with the chamber causes a linear movement of the piston toward the rotating member; and
wherein the linear movement of the piston allows the rotating member and the magnet to rotate and the rotational movement of the magnet to be sensed by the magnetic field sensor.

18. The differential pressure gauge of claim 17, wherein a first spring disposed in the chamber urges the piston towards a position adjacent the first end of the chamber and wherein the first spring is compressed when the piston is moved from the position adjacent the first end of the chamber.

19. The differential pressure gauge of claim 18, wherein a second spring is connected to the rotating member and the rotation of the rotating member causes the second spring to be compressed when the piston is in the position adjacent the first end of the chamber and wherein the rotation of the rotating member decompresses the second spring when the piston moves away from the position adjacent the first end of the chamber.

20. The differential pressure gauge of claim 17, wherein the magnetic field sensor produces a voltage output based on the rotational movement of the magnet, and wherein the voltage output is converted to a visual output using a digital chip for observation by a user.

* * * * *